United States Patent [19]
Taketsugu

[11] Patent Number: 5,892,759
[45] Date of Patent: Apr. 6, 1999

[54] DATA TRANSMISSION CONTROL SYSTEM FOR PERFORMING ONE-TO-MULTIPLE SITE DATA TRANSMISSION BY THE USE OF RADIO PACKET COMMUNICATION

[75] Inventor: Masanori Taketsugu, Tokyo, Japan

[73] Assignee: NEC Corporation, Japan

[21] Appl. No.: 795,888

[22] Filed: Feb. 5, 1997

[30] Foreign Application Priority Data

Feb. 5, 1996 [JP] Japan ................................. 8-044273

[51] Int. Cl.⁶ ............................ H04J 3/24; H04L 1/08
[52] U.S. Cl. ....................... 370/349; 371/33; 370/312; 370/428
[58] Field of Search .................... 370/277, 280, 370/312, 341, 347, 349, 338, 420, 432, 449, 337, 346, 348, 447; 371/32, 33

[56] References Cited

U.S. PATENT DOCUMENTS

| | | | |
|---|---|---|---|
| 4,888,767 | 12/1989 | Furuya et al. | 370/95.2 |
| 5,168,502 | 12/1992 | Millet et al. | 371/32 |
| 5,553,083 | 9/1996 | Miller | 371/32 |
| 5,555,266 | 9/1996 | Buchholz et al. | 370/347 |
| 5,563,895 | 10/1996 | Malkamaki et al. | 371/32 |
| 5,610,595 | 3/1997 | Garrabrant et al. | 370/394 |
| 5,657,326 | 8/1997 | Burns et al. | 370/349 |
| 5,757,790 | 5/1998 | Taketsugu | 370/342 |

FOREIGN PATENT DOCUMENTS

| | | |
|---|---|---|
| 60-35851 | 2/1985 | Japan . |
| 2179827 | 3/1987 | United Kingdom . |
| 2302243 | 1/1997 | United Kingdom . |

OTHER PUBLICATIONS

S.B. Calo, et al., "A Broadcast Protocol for File Transfers to Multiple Sites", *IEEE Transactions on Communications*, vol. COM–29, No. 11, Nov. 1981, pp. 1701–1707.

*Primary Examiner*—Chau Nguyen
*Assistant Examiner*—Soon-Dong Hyun
*Attorney, Agent, or Firm*—Ostrolenik, Faber, Gerb & Soffen, LLP

[57] ABSTRACT

A transmission control system for performing one-to-multiple site data transmission by a radio packet communication, comprising a plurality of communication terminals and a communication base station for determining timing of access control as well as timing of sending and receiving transmission data, the communication terminals and the communication base station being connected via a radio packet communication system, in which the communication terminal sends a negative acknowledgment signal on the failure in receiving a packet signal sent from the communication base station, the communication base station resends the packet signal which is not received by the communication terminal upon receipt of the negative acknowledgment signal, and the communication terminal sending the packet signal resends the packet signal which was sent just before, upon receipt of the packet signal resent from the communication base station.

14 Claims, 11 Drawing Sheets

⇨ RECEIVING BUFFER IS CLEARED IN A NAK SENDING TERMINAL PS

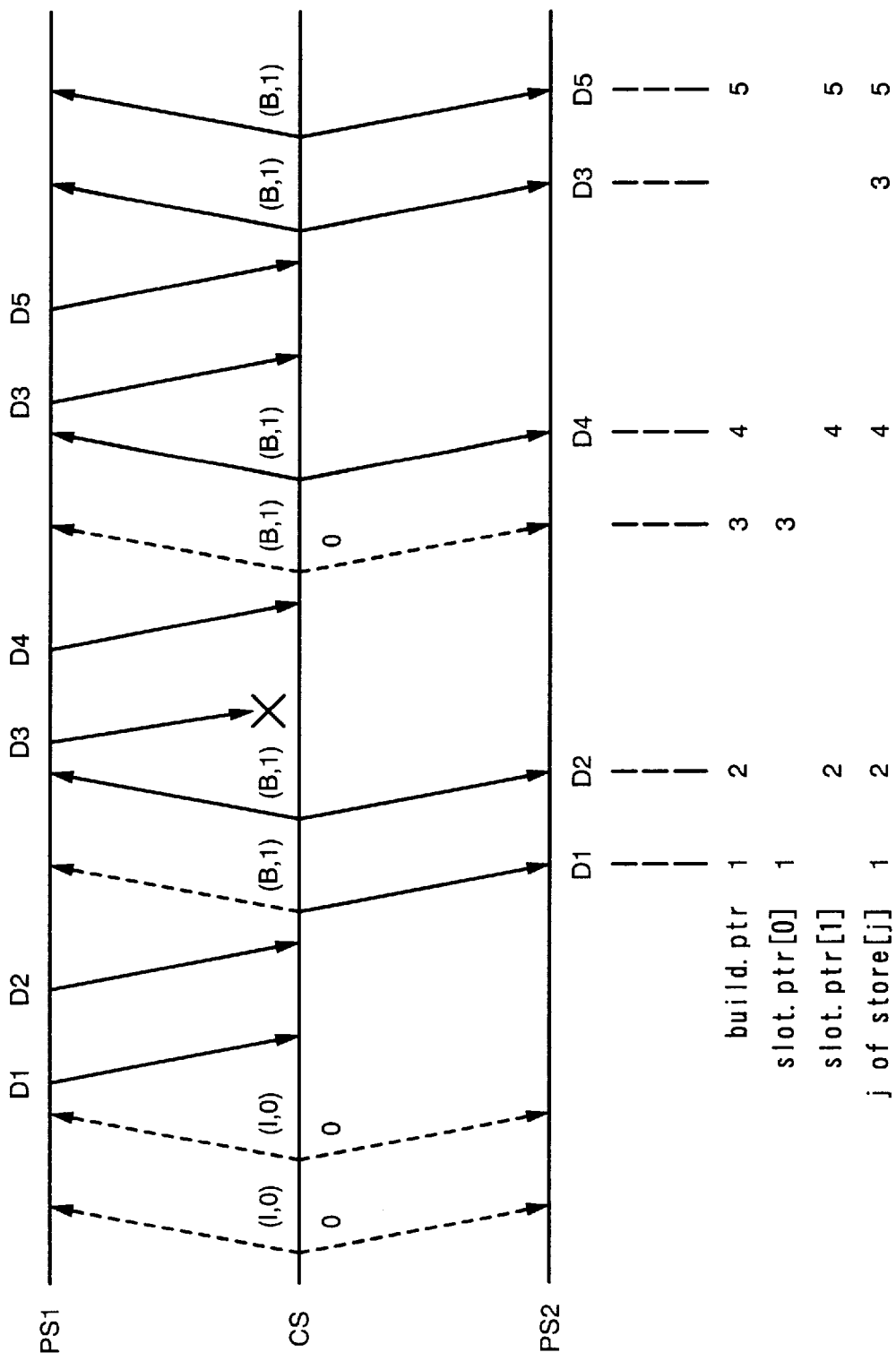

DATA TRANSMISSION CONTROL SYSTEM FOR PERFORMING ONE-TO-MULTIPLE SITE DATA TRANSMISSION BY THE USE OF RADIO PACKET COMMUNICATION

BACKGROUNDS OF THE INVENTION

1. Field of the Invention

The present invention relates to a transmission control system for controlling data transmission in radio packet communication, and more particularly, relates to a transmission control system for rendering acknowledgment in the data transmission by the use of one-to-multiple site communication.

2. Description of the Related Art

In one-to-multiple site communication on a network having the structure of an ad hoc network which is not connected to a fixed network, like a radio LAN or the like, acknowledgment processing is performed in order to surely confirm the acceptance of the data in every link. Such acknowledgment processing is performed in the same way as that in the one-to-one communication. On the contrary, the acknowledgment processing is not generally performed in the one-to-multiple site communication by the use of satellite communication, because it is inefficient to get the acknowledgment from all communication terminals and it is not practical to do so from the viewpoint of the reliability of the acknowledgment itself.

However, if the acknowledgment processing is not performed, reliability of signal transmission is extremely decreased. Therefore, proposed is a means for blocking the data to confirm the acceptance of the data for the purpose of increasing the reliability in the signal transmission. As this kind of technique, there is a technique, for example, described in the article "A Broadcast Protocol for File Transfers to Multiple Site", IEEE Trans. Commun., Vol. COM-29, No. 11, pp. 1701–1707, November 1981 written by Calo, S. B. et al.

However, in the above conventional technique of blocking the data to do acknowledgment, as the data size of one block becomes larger, each communication terminal must have a buffer of larger volume according to the size of the block, which results in increasing the cost of hardware disadvantageously. Further, increase in the procedure accompanied by the blocking of the data causes a defect such as to complicate the processing.

Also, a means for notifying not only the acknowledgment but also negative acknowledgment to confirm the acceptance is proposed in order to prevent from decreasing efficiency. As this kind of technique, there is a technique, for example, disclosed in Japanese Patent Publication Laid-Open (Kokai) No. Heisei 60-35851 "Communication System". In the same publication, a method is disclosed, in which when a receiving terminal couldn't receive a packet signal correctly, a negative acknowledgment signal (hereinafter, referred to as a NAK signal) is transmitted to collide with an acknowledgment signal (hereinafter, referred to as an Ack signal) or the NAK signal sent by a specified receiving terminal, thereby recognizing the failure of the data transmission, and retry is requested of the sending terminal.

However, the above conventional technique also has such a defect that it takes a lot of time to detect the Ack signal/the NAK signal, or detect the collision between the NAK signal and the Ack signal, indifferently to whether or not the Ack signal or NAK signal can be received correctly.

As mentioned above, in the conventional one-to-multiple site communication by the use of a satellite, the acknowledgment is not performed generally, thereby to reduce the reliability of the signal transmission.

When the acknowledgment is performed by blocking the data, it has such a defect as to increase the cost of the hardware according to the increase in the buffer capacity as well as to complicate the procedure accompanied by the blocking of the data.

Further, when the no-acceptance is confirmed by sending the negative acknowledgment signal, it takes a lot of time to recognize the failure of the data transmission, which results in preventing from the prompt response.

SUMMARY OF THE INVENTION

In order to solve the above conventional problems, it is an object of the present invention to provide a transmission control system capable of resending a packet signal without giving the excessive load to a sending terminal, for performing the acknowledgment efficiently in the data transmission by the use of the one-to-multiple site communication.

In addition to the above object, it is another object of the present invention to provide a transmission control system capable of realizing the efficient acknowledgment processing without increasing the cost of the hardware and complicating the procedure.

According to one aspect of the invention, a transmission control system for performing one-to-multiple site data transmission by a radio packet communication, comprises a plurality of communication terminals and a communication base station for determining timing of access control as well as timing of sending and receiving transmission data, said communication terminals and said communication base station being connected via a radio packet communication system;

wherein said communication terminal as a receiving terminal sends a negative acknowledgment signal on the failure in receiving a packet signal sent from said communication base station, said communication base station resends the packet signal which is not received by said communication terminal upon receipt of the negative acknowledgment signal, and said communication terminal sending the packet signal as a sending terminal resends the packet signal which was sent just before upon receipt of the packet signal resent from said communication base station.

In the preferred construction, the communication base station relays a received packet signal to said communication terminal with access control information added thereto, and the communication terminal judges whether or not the packet signal is the packet signal resent from said communication base station, with reference to the access control information added to the received packet signal.

In the preferred construction, the communication base station relays the received packet signal to said communication terminal with access control information added thereto, the communication terminal judges whether or not the packet signal is the packet signal resent from said communication base station, with reference to the access control information added to the received packet signal, the communication terminal sending the negative acknowledgment signal, when recognizing the received packet signal as the packet signal resent from said communication base station on the basis of the access control information, performs receiving operation of the same packet signal, and the communication terminal which doesn't send the negative acknowledgment signal, when recognizing the received packet signal as the packet signal resent from said communication base station on the basis of the access control information, discards the received pack signal.

In another preferred construction, the communication base station relays the received packet signal to said communication terminal with access control information added thereto, the communication terminal judges whether or not the packet signal is the packet signal resent from said communication base station, with reference to the access control information added to the received packet signal, the communication terminal sending the negative acknowledgment signal, on the basis of the access control information, performs receiving operation of the packet signal when recognizing the received packet signal as the packet signal resent from said communication base station, and discards the packet signal and all the continued packet signal following this packet signal until receiving a new packet signal when recognizing the received packet signal as the packet signal which is not resent from said communication base station, and the communication terminal which doesn't send the negative acknowledgment signal discards the received packet signal, when recognizing the received packet signal as the packet signal resent from said communication base station on the basis of the access control information.

In another preferred construction, the communication base station relays the received packet signal to said communication terminal with access control information added thereto, the communication terminal judges whether or not the packet signal is the packet signal resent from said communication base station, with reference to the access control information added to the received packet signal, the communication base station sends the access control information as well as a part of data of the packet signal as a specified value determined beforehand when failing in receiving a packet signal at the timing when it should be received, the communication terminal sending the packet signal failed in reaching said communication base station, resends the packet signal failed in reaching said communication base station upon receipt of a packet signal having the specified access control signal and data, and the other of said communication terminal, upon receipt of the packet signal having the specified access control signal and data, discards the packet signal and prepares for receiving the next packet signal.

Also, the communication base station relays the received packet signal to said communication terminal with access control information added thereto, the communication terminal judges whether or not the packet signal is the packet signal resent from said communication base station, with reference to the access control information added to the received packet signal, the communication base station sends the access control information as well as a part of data of the packet signal as a specified value determined beforehand when failing in receiving a packet signal at the timing when it should be received, the communication terminal sending the packet signal failed in reaching said communication base station, resends the packet signal failed in reaching said communication base station upon receipt of a packet signal having the specified access control signal and data, the other of said communication terminal, upon receipt of the packet signal having the specified access control signal and data, discards the packet signal and prepares for receiving the next packet signal, the communication base station, when two consecutive failing in receiving a packet signal at the timing when it should be received, sends a packet signal including the information that it doesn't receive the packet signal, the communication terminal sending the packet signal failed in reaching said communication base station, upon receipt of the packet signal including the information that said communication base station doesn't receive the packet signal, resends the packet signal failed in reaching said communication base station, and other of said communication terminal, upon receipt of the packet signal including the information that said communication base station doesn't receive the packet signal, discards the packet signal and prepares for receiving the next packet signal.

Also, the communication terminal, provided with a plurality of slots, performs sending and receiving operation of a packet signal using a plurality of independent channels between said communication base station and itself.

In the preferred construction, the communication base station comprises an access control information creating means for creating access control information, a collision/NAK signal detecting means for detecting collision between a packet signal and the negative acknowledgment signal or detecting acceptance of the negative acknowledgment signal on a communication line, a packet signal sending and receiving control means adding the access control information created by said access control information creating means to a received packet signal, for resending the necessary packet signal on the basis of the detection result of said collision/NAK signal detecting means, and a sending and receiving means for receiving a given signal on said communication line including the packet signal sent from said communication terminal, and for sending a packet signal to said communication terminal according to the control of said packet signal sending and receiving control means, the communication terminal comprises a sending and receiving means for sending to said communication base station a packet signal supplied from a packet signal sending control means and for receiving a packet signal sent from said communication base station, as means for realizing a function of a sending terminal, an access control information analytical means for detecting the access control information out of the packet signal sent from said communication base station and analyzing the same, and a packet signal sending control means for creating and supplying a packet signal on the basis of a given rule, and for supplying the packet signal which was sent just before, once more, when judging that said terminal has received the packet signal resent from said communication base station, on the basis of the analytical result of said access control information analytical means, as means for realizing a function of a receiving terminal, a packet signal receiving means for receiving and analyzing the packet signal sent from said communication base station, an access control information analytical means for detecting the access control information out of the packet signal sent from said communication base station and analyzing the same, and a NAK signal creating means for creating and supplying the negative acknowledgment signal when judging that said terminal can't receive a packet signal on the basis of the analytical result of said access control information analytical means.

In the above-mentioned construction, the access control information includes at least the information indicating address of polling destination and the information indicating whether the communication line is busy or idle.

In the above-mentioned construction, with reference to the access control information added to a received packet signal, said packet signal sending control means and said packet signal receiving means judge whether or not the packet signal is the packet signal resent from said communication base station.

Also, when a received packet signal is judged to be the packet signal resent from said communication base station with reference to the access control information added to the received packet signal, said packet signal sending control means discards the received packet signal, and when the packet signal is judged to be the packet signal resent from said communication base station on the basis of the analytical result of said access control information analytical means with respect to the access control information detected out of the packet signal sent from said communication base station after said NAK signal creating means supplies the negative acknowledgment signal, said packet signal receiving means performs the ordinal receiving processing of the packet signal, when the packet signal is judged to be the packet signal resent from said communication base station, discards the packet signal and all the continued packet signal following this packet signal until receiving a new packet signal.

In another preferred construction, the packet signal sending and receiving control means of said communication base station sends the access control information and a part of data of the packet signal as a given value determined beforehand, controlling said access control information creating means, when it can't receive the packet signal at the timing when it should be received, the packet signal sending control means of said communication terminal sending the packet signal failed in reaching said communication base station, resends the packet signal failed in reaching said communication base station when it judges that a packet signal having the specified access control signal and data is received, according to the analytical result of said access control information analytical means, and the packet signal receiving means of the other of said communication terminal discards a packet signal and prepares for receiving the next packet signal, when it judges that the packet signal having the specified access control signal and data is received according to the analytical result of said access control information analytical means.

In another preferred construction, the packet signal sending and receiving control means of said communication base station sends the access control information and a part of data of the packet signal as a given value determined beforehand, controlling said access control information creating means, when it can't receive the packet signal at the timing when it should be received, the packet signal sending control means of said communication terminal sending the packet signal failed in reaching said communication base station, resends the packet signal failed in reaching said communication base station when it judges that a packet signal having the specified access control signal and data is received, according to the analytical result of said access control information analytical means, the packet signal receiving means of the other of said communication terminal discards a packet signal and prepares for receiving the next packet signal, when it judges that the packet signal having the specified access control signal and data is received, according to the analytical result of said access control information analytical means, the packet signal sending and receiving control means of said communication base station sends a packet signal including the information that it doesn't receive the packet signal, when failing several times in receiving a packet signal at the timing when it should be received continuously, the packet signal sending control means of said communication terminal sending the packet signal failed in reaching said communication base station, resends the packet signal failed in reaching said communication base station, when judging that it has received the packet signal including the information that said communication base station doesn't receive the packet signal, according to the analytical result of said access control information analytical means, and the packet signal receiving means of the other of said communication terminal, discards the packet signal and prepares for receiving the next packet signal, when judging that it has received the packet signal including the information that said communication base station doesn't receive the packet signal, according to the analytical result of said access control information analytical means.

Further objects, features and effects of the present invention will be apparent from the following detailed description.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 17 is a sequence view for describing the movement according to the embodiment in the case of FIG. 14.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
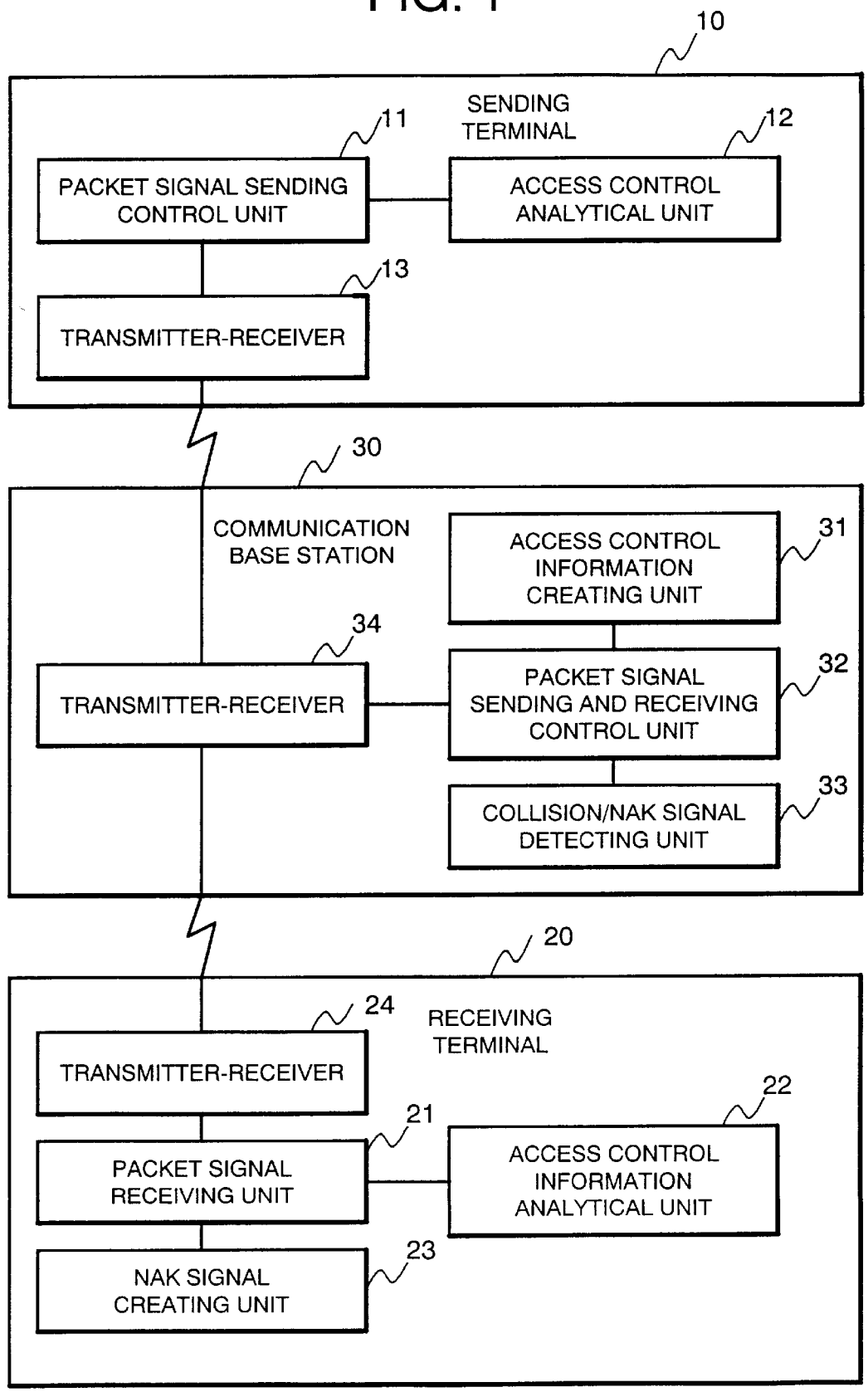
FIG. 1 is a block diagram showing a constitution of a transmission control system according to the embodiment of the present invention.

FIG. 1 is a block diagram showing a constitution of a transmission control system according to one embodiment of the present invention.

The transmission control system of the present invention is provided with a plurality of communication terminals and a communication base station for determining timing of access control as well as timing of sending and receiving transmission data. The communication terminal and the radio station are not connected to a fixed network, but connected via a radio packet communication system. Hereinafter, this embodiment will be described with the communication terminals functionally divided into a sending one and a receiving one. However, it is needless to say that all the communication terminals can serve as the sending terminal, the receiving terminal and the radio station.

Figure 2:
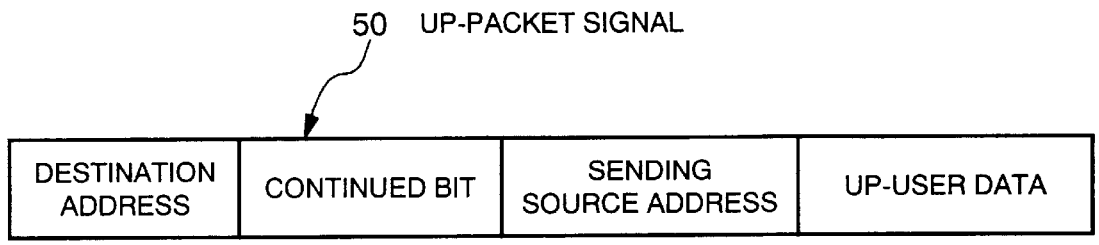
FIG. 2 is a view showing a constitution of up-packet signal of the embodiment.
Figure 3:
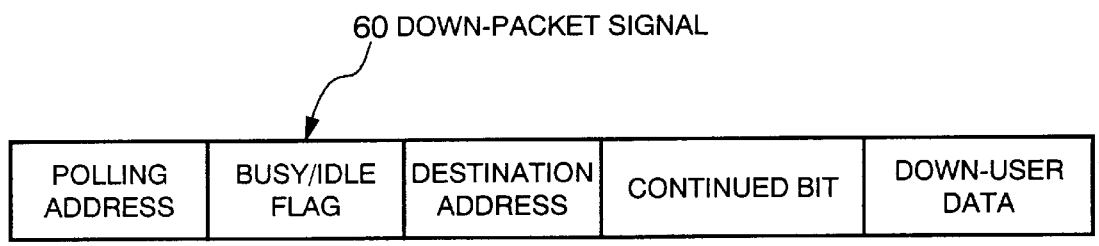
FIG. 3 is a view showing a constitution of down-packet signal of the embodiment.

As illustrated in FIG. 1, the transmission control system of the embodiment comprises a sending terminal 10 of sending a packet signal, a receiving terminal 20 of receiving the packet signal, and a communication base station 30 located between the sending terminal 10 and the receiving terminal 20 for performing the transmission control. The packet signal for transferring from the sending terminal 10 to the communication base station 30 is defined as an up-packet signal, and the packet signal for transferring from the communication base station 30 to the receiving terminal 20 is defined as a down-packet signal. FIG. 2 shows a constitution of the up-packet signal, and FIG. 3 shows a constitution of the down-packet signal.

As illustrated in FIG. 2, the up-packet signal 50 includes a destination address showing the address of the party to which a transmission data is sent, a continued bit showing the presence of user data continued from the transmission data, a sending source address showing the address of the party from which the transmission data is sent, and an up-user data of the transmission data. The down-packet signal 60 includes a polling address showing the address of the polling destination, a Busy/Idle flag showing the state of the communication line being busy or idle, a destination address, a continued bit and a down-user data of the transmission data. Of these, the polling address and the Busy/Idle flag are access control information for use in the access control in the embodiment.

With reference to FIG. 1, the sending terminal 10 includes a packet signal sending control unit 11 for creating the packet signal and providing the same, an access control information analytical unit 12 for detecting the access control information from the down-packet signal sent from the communication base station 30 and analyzing the same, and a transmitter-receiver 13 for sending and receiving the data to and from the communication base station 30.

The packet signal sending control unit 11 is realized by, for example, a program-controlled CPU and a memory. The unit 11 creates the up-packet signal 50 with the bibliography data such as the destination address, continued bit, sending source address added to the user data, and sends it to the communication base station 30 via the transmitter-receiver 13. Further, the unit 11 resends the up-packet signal 50 having been sent, according to the control of the access control information analytical unit 12.

The access control information analytical unit 12 is realized by, for example, a program-controlled CPU and a memory, and the unit 12 takes out the polling address and the Busy/Idle flag of the access control information from the down-packet signal 60 sent from the communication base station 30 and analyzes the same. The unit 12 gives an instruction to the packet signal sending control unit 11 so as to send a new up-packet signal 50 including the continued user data or to resend the up-packet signal 50 which has been sent just before.

The receiving terminal 20 includes a packet signal receiving unit 21 for receiving the down-packet signal 60 sent from the communication base station 30 and analyzing the same, an access control information analytical unit 22 for detecting the access control information from the down-packet signal 60 and analyzes the same, a NAK signal creating unit 23 for creating the NAK signal and providing the same, and the transmitter-receiver 24 for sending and receiving the data to and from the communication base station 30.

The packet signal receiving unit 21 is realized by, for example, a program-controlled CPU and a memory. The unit 21 receives the down-packet signal 60 and confirms the presence of the continued packet signal 60 with reference to the continued bit. When there is the continued bit, the unit 21 waits for receiving the continued down-packet signal 60. When there is no acceptance of the continued packet signal 60 at a given timing, the unit 21 gives an instruction to the NAK signal creating unit 23 so as to create the NAK signal. As described below, the unit 21 discards the received packet signal and clears the receive buffer according to the instruction of the access control information analytical unit 22.

The access control information analytical unit 22 is realized by, for example, a program-controlled CPU and a memory. The unit 22 takes out the access control information from the down-packet signal delivered from the communication base station 30 and analyzes the same. The unit 22 instructs the packet signal receiving unit 21 to discard the packet signal, or to clear the receive buffer to discard all packet signal continued after the corresponding packet signal, according to the analytical result.

Figure 4:
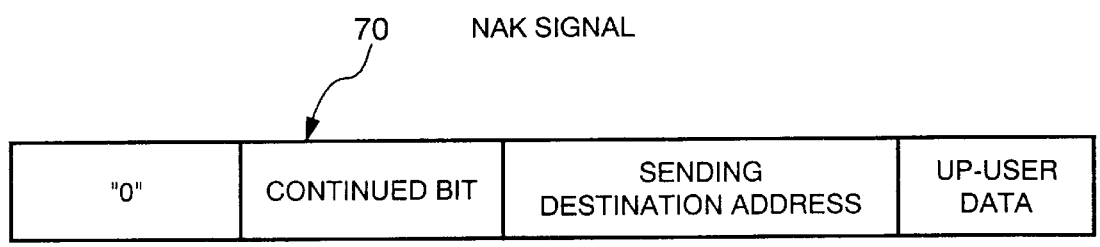
FIG. 4 is a view showing a constitution of a negative acknowledgment signal of the embodiment.

The NAK signal creating unit 23 is realized by, for example, a program-controlled CPU and a memory. The unit 23 creates the NAK signal according to the instruction of the packet signal receiving unit 21 and sends the same to the communication base station 30 via the transmitter-receiver 24. FIG. 4 shows a constitution of the NAK signal. As illustrated in FIG. 4, the NAK signal 70 has the same structure as that of the up-packet signal, in which the destination address is "0".

The communication base station 30 includes an access control information creating unit 31 for creating the access control information, a packet signal sending and receiving control unit 32 for controlling sending and receiving of the packet signal, a collision/NAK signal detecting unit 33 for detecting the collision between the packet signal and the NAK signal 70 or detecting the acceptance of the NAK signal 70 in the communication line, and a transmitter-receiver 34 for sending and receiving the data to and from the communication terminal.

The access control information creating unit 31 is realized by, for example, a program-controlled CPU and a memory.

The unit 31 creates the polling address and the Busy/Idle flag and adds them to the packet signal. When the collision between the up-packet signal 50 and the NAK signal 70, or the acceptance of the NAK signal 70 is detected by the collision/NAK signal detecting unit 33, the value of the polling address is defined as "0". The Busy/Idle flag is defined as Busy during the communication line is busy, and defined as Idle during it is idle.

The packet signal sending and receiving control unit 32 is realized by, for example, a program-controlled CPU and a memory. The unit 32 changes to the down-packet signal 60 the up-packet signal 50 delivered from the sending terminal 10, and sends the same to the receiving terminal 20 via the transmitter-receiver 34. The destination address, continued bit and up-packet user data of the up-packet signal 50 is shifted to the destination address, continued bit, down-user data of the down-packet signal 60, with the access control information added thereto. The unit 32 takes out the sending source address from the up-packet signal 50 and stores it. When the collision between the up-packet signal 50 and the NAK signal 70, or the acceptance of the NAK signal 70 was detected by the collision/NAK signal detecting unit 33, or when the up-packet signal 50 which should be sent at a given timing was not received, the unit 32 resends the down-packet signal 60 which was sent just before the value of the polling address turned to "0", or transmits the down-packet signal 60 with the value of the destination address fixed at "0", according to the condition. When the down-packet signal 60 is transmitted, with the value of the destination address fixed as "0", this packet signal doesn't include the user data.

The collision/NAK signal detecting unit 33 is realized by, for example, a program-controlled CPU and a memory. Detecting the collision between the up-packet signal 50 and the NAK signal 70 in the communication line, or detecting the acceptance of the NAK signal 70, the unit 33 notifies it to the access control information creating unit 31 and the packet signal sending and receiving control unit 32.

This time, a movement of the embodiment will be concretely described with some aspects.

FIGS. 5 to 13 are sequence views respectively showing an example of the data transmission control according to the embodiment. In each figure, it is indicated as B when the Busy/Idle flag is Busy, and indicated as I when it is Idle. When the value of the polling address is "a" and the communication line is busy, the access control information is indicated as (B, a), and when the value of the polling address is "a" and the communication line is idle, the access control information is indicated as (I, a). CS represents the communication base station, and PS1, PS2 and PS3 respectively represent the communication terminals each having address 1, 2 and 3. Each communication terminal PS1, PS2 and PS3 has a common group address. In the example of each figure, PS1 is regarded as a sending terminal and PS2 and PS3 are regarded as receiving terminals. Packet signals D0, D1, D2, D3 and D4 are transmitted from the sending terminal PS1. As far as there is no specification, the data transmission from the communication base station is performed with the group address common to each communication terminal used as the destination address. In each figure, the packet signal indicated by the solid line represents the packet signal having the destination address specified and including user data, and the packet signal indicated by the broken line represents the packet signal having the destination address "0" and including no user data, the value "0" indicating that any communication terminal is not specified.

Figure 5:
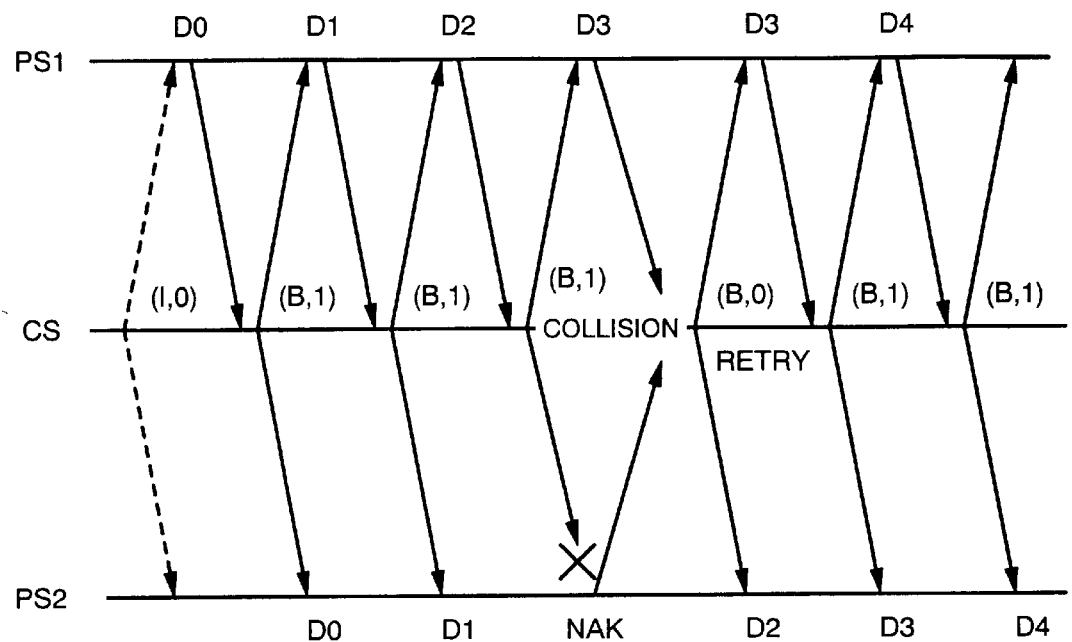
FIG. 5 is a sequence view for describing an example of movement according to the embodiment.

FIG. 5 shows a movement in the case where because the packet signal transmitted from the communication base terminal CS doesn't reach the receiving terminal PS2, the NAK signal is sent from the receiving terminal PS2 and the collision occurs between the next packet signal and the NAK signal.

With reference to FIG. 5, the communication base station CS sends (I, 0) as the access control information for a down-packet signal. Each communication terminal PS receives the above access control information and stores the sending timing for up-signal.

When the sending terminal PS1 sends the packet signal D0 at the sending timing of the up-signal, the communication base station CS, upon receipt of the packet signal D0, judges the presence of the continued packet signal on the basis of the up-user data and the continued bit, stores the same, and transmits the down-packet signals correspondingly to the receiving timing of the up-packet signal. At this point, the up-packet signal is shifted to the down-packet signal.

The sending terminal PS1 receiving the down-packet signal confirms that it is the data sent by the terminal PS1 oneself, viewing the access control information of the same packet signal, and prepares for sending the next packet signal.

The receiving terminal PS2 receiving the down-packet signal takes in the down-user data, judges the presence of the continued packet signal in reference to the continued bit and stores the result.

The sending terminal PS1 sends the continued packet signal D1 at the sending timing of the next up-packet signal, and the communication base station CS and the sending terminal PS1 and the receiving terminal PS2 run in the same procedure as mentioned above.

This time, assume that, though the continued packet signal D2 sent from the sending terminal PS1 in the same procedure was accepted by the communication base station CS and sent as the down-packet signal, it is not accepted by the receiving terminal PS2. In this case, it is judged in the receiving terminal PS2 that the packet signal receiving unit 21 cannot receive the down-packet signal at the receiving timing on the basis of the stored continued bit. The NAK signal creating unit 23 creates the NAK signal and sends it at the sending timing of the next up-signal. The sending terminal PS1 sends the continued packet signal D3 at the same sending timing as the above. Therefore, a collision occurs on the radio communication line.

In the communication base station CS, when the collision/NAK signal detecting unit 33 detects the collision of the up-packet signals or it accepts the NAK signal by the capture effect, the access control information creating unit 31 judges that the NAK signal has been sent from the receiving terminal PS2 according to the stored information on the continued bit and the access control information is turned to (B, 0). The packet signal sending and receiving control unit 32 sends the new access control information (B, 0) together with the user data of the continued packet signal D2 sent at the down-sending timing just before the collision as a down-packet signal for retry.

When the sending terminal PS1 receives the down-packet signal indicated by the access control information as (B, 0), the packet signal sending control unit 11 judges that the D3 sent just before the collision cannot reach the communication base station CS, and prepares for retry of the continued packet signal D3.

When the receiving terminal PS2 receives the down-packet signal indicated by the access control information as (B, 0), the packet signal receiving unit 21 judges that the retry request has been accepted, and performs the receiving processing of the down-user data of the received down-packet signal.

Hereinafter, the continued packet signals D3 and D4 are transmitted in the same way.

Figure 6:
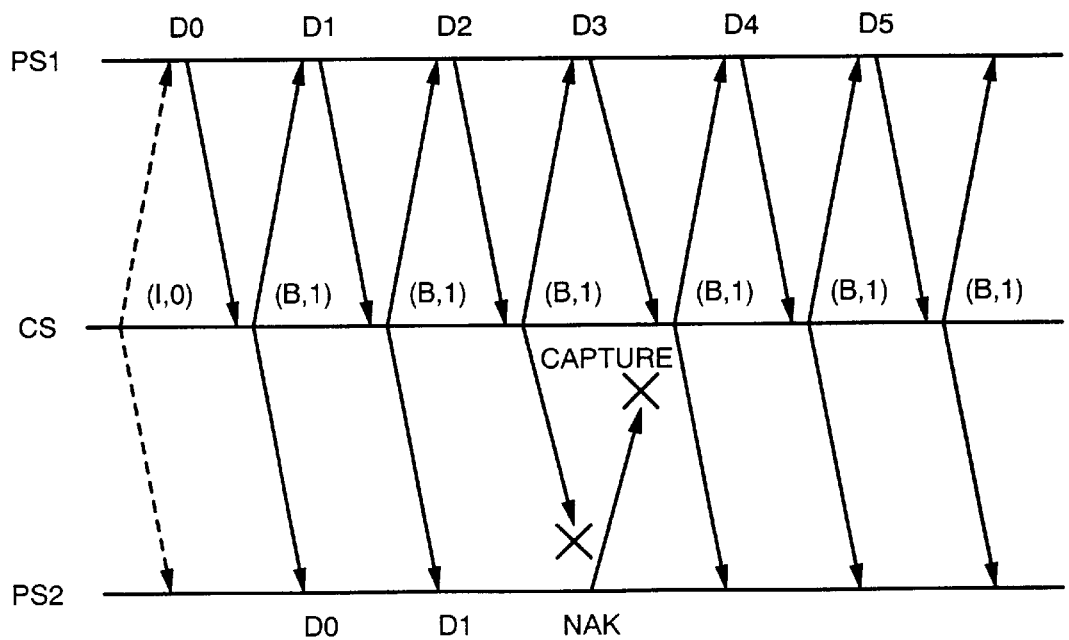
FIG. 6 is a sequence view for describing the other example of movement according to the embodiment.

FIG. 6 shows a movement in the case where the packet signal sent from the communication base station CS doesn't reach the receiving terminal PS2 and the NAK signal is sent from the receiving terminal PS2, this process is the same as that of FIG. 5, however, the same NAK signal doesn't reach the communication base station CS.

As illustrated in FIG. 6, since not receiving the NAK signal, the communication base station CS receives the continued packet signal D3 from the sending terminal PS1. Therefore, the communication base station CS performs the same processing as that in the normal receiving, fixing the access control information as (B, 1) and sending the access control information (B, 1) together with the user data of the received packet signal D3 as a down-packet signal.

When the receiving terminal PS2 receives the down-packet signal, the access control information analytical unit 22 judges that the NAK signal has not been accepted by the communication base station CS according to the access control information of (B, 1). The packet signal receiving unit 21 clears the receiving buffer and continuously discards the continued packet signal every time when receiving a packet signal continued by this packet signal.

Figure 7:
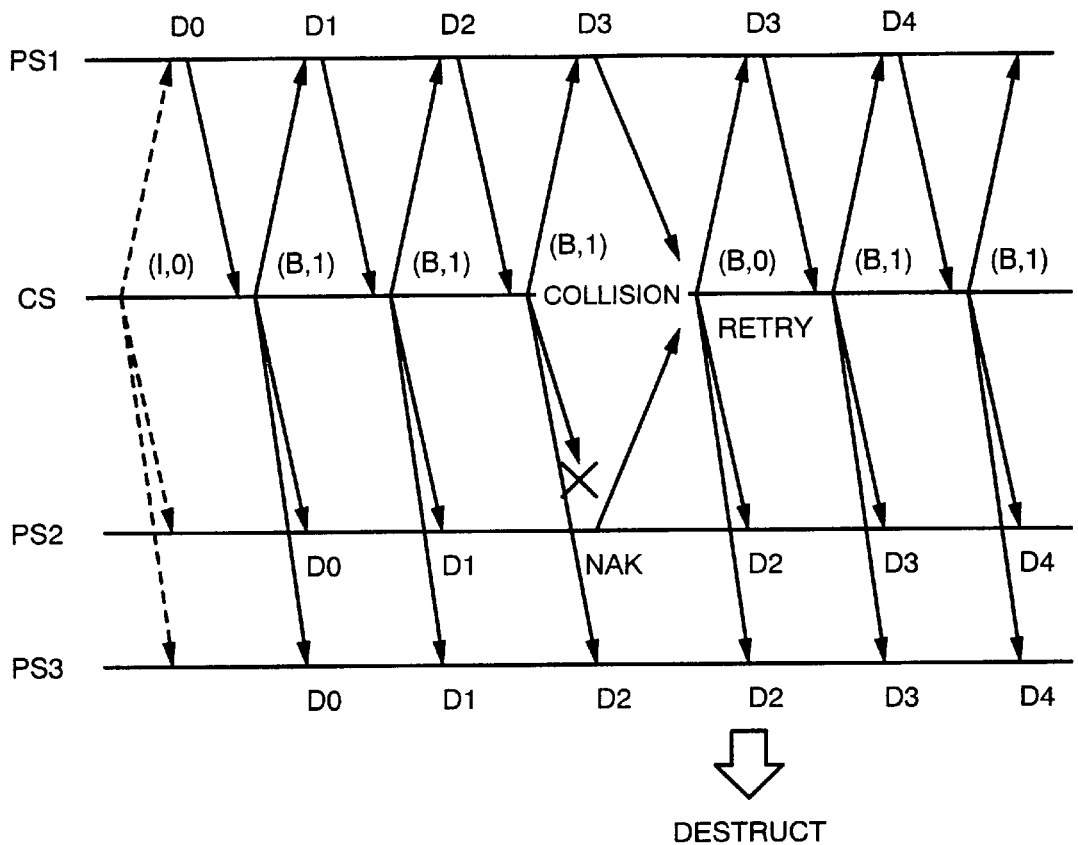
FIG. 7 is a sequence view for describing the further example of movement according to the embodiment.

FIG. 7 shows a movement in the case where there are a plurality of receiving terminals and one of the receiving terminals can't receive a packet signal but sends the NAK signal.

The movement of the communication base station CS and the sending terminal PS1 and the receiving terminal PS2 from the step of sending the packet signal D2 by the sending terminal PS1 through the step of receiving it by the communication base station CS is the same as that of FIG. 5. The communication terminal PS3 is a receiving terminal in this case, running similarly to the receiving terminal PS2.

Assume that the communication base station CS sends down-packet signals correspond to the packet signal D2, and that the down-packet signal is not received by the receiving terminal PS2 but received by the receiving terminal PS3.

In the receiving terminal PS2, the packet signal receiving unit 21 judges that it couldn't receive the down-packet signal at the timing when it should be received, according to the stored continued bit. The NAK signal creating unit 23 creates a NAK signal and sends it at the sending timing of the next up-signal. At this time, the sending terminal PS1 sends the continued packet signal D3 at the same sending timing. Therefore, a collision occurs on the radio communication line.

In the communication base station CS, when the collision/NAK signal detecting unit 33 detects the collision of the up-packet signals or it receives the NAK signal by the capture effect, the access control information creating unit 31 judges that the NAK signal has been sent from the receiving terminal PS2 according to the stored information on the continued bit and the access control information is turned to (B, 0). The packet signal sending and receiving control unit 32 sends the new access control information (B, 0) together with the user data of the continued packet signal D2 sent at the down-sending timing just before as a down-packet signal for retry.

When the sending terminal PS1 receives the down-packet signal indicated by the access control information as (B, 0), the packet signal sending control unit 11 judges that the D3 it sent just before couldn't reach the communication base station CS, and prepares for retry of the continued packet signal D3.

When the receiving terminal PS2 receives the down-packet signal indicated by the access control information as (B, 0), the packet signal receiving unit 21 judges that the retry request has been accepted, and performs the receiving operation of the down-user data of the received down-packet signal.

Since the receiving terminal PS3 has received the down-packet signal with the access control information fixed as (B, 0) although it didn't send the NAK signal by oneself, the access control information analytical unit 22 judges that the other receiving terminal sent the NAK signal so that the communication base station CS resent the foregoing packet signal, and the packet signal receiving unit 21 discards the received down-packet signal. In this processing, only the present packet signal is discarded and receiving processing will be continuously performed from the continued packet signal received at the next timing, differently from the movement described with reference to FIG. 6.

Figure 8:
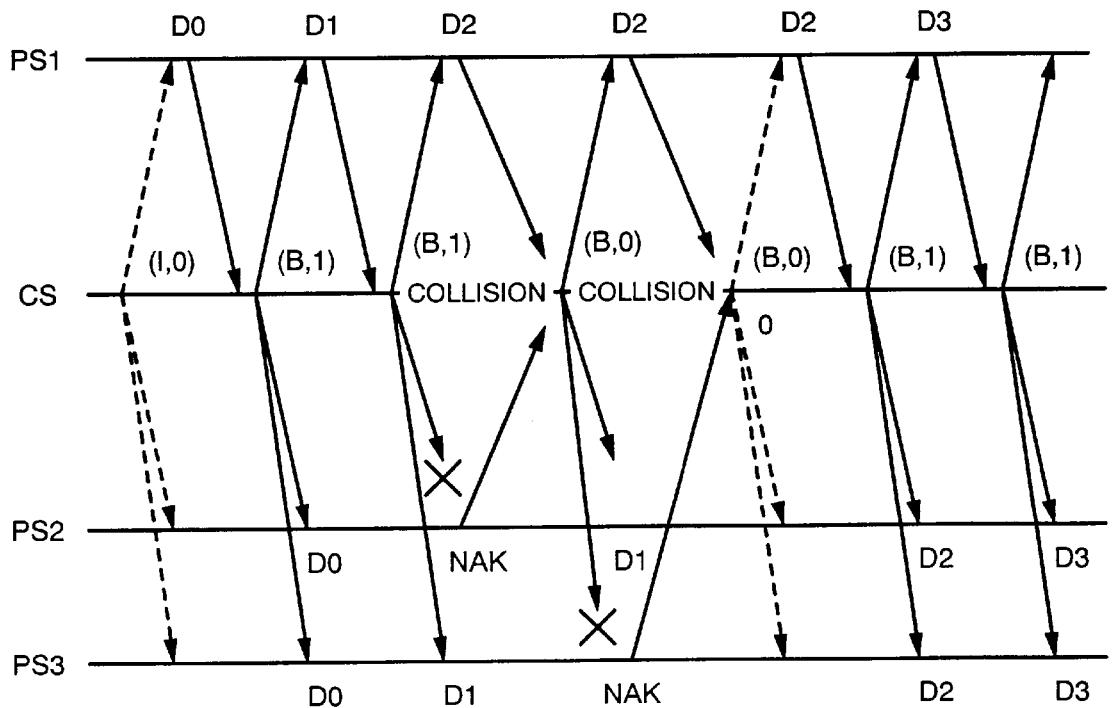
FIG. 8 is a sequence view for describing the further example of movement according to the embodiment.

FIG. 8 shows a movement in the case where there are a plurality of receiving terminals, and although the communication base station CS resends a packet signal in respond to the NAK signal sent by one of the receiving terminals which was failed in receiving the packet signal, the other receiving terminal doesn't receive the resent packet signal but sends a NAK signal.

The movement of the communication base station CS and the sending terminal PS1, the receiving terminals PS2 and PS3 from the step of sending the packet signal D1 by the sending terminal PS1 through the step of receiving it by the communication base station CS is the same as that of FIG. 7. Assume that the communication base station CS sends down-packet signals correspond to the packet signal D1, and that the down-packet signal is not received by the receiving terminal PS2 but received by the receiving terminal PS3.

In the receiving terminal PS2, the packet signal receiving unit 21 judges that it couldn't receive the down-packet signal at the timing when it should be received, according to the stored continued bit. The NAK signal creating unit 23 creates a NAK signal and sends it at the sending timing of the next up-signal. At this time, the sending terminal PS1 sends the continued packet signal D2 at the same sending timing. Therefore, a collision occurs on the radio communication line.

In the communication base station CS, when the collision/NAK signal detecting unit 33 detects the collision of the up-packet signals or it receives the NAK signal by the capture effect, the access control information creating unit 31 judges that the NAK signal has been sent from the receiving terminal according to the stored information on the continued bit, and the access control information is turned to (B, 0). The packet signal sending and receiving control unit 32 sends the new access control information (B, 0) together with the user data of the continued packet signal D1 sent at the down-sending timing just before as a down-packet signal for retry.

When the sending terminal PS1 receives the down-packet signal indicated by the access control information as (B, 0), the packet signal sending control unit 11 judges that the D2 it just sent couldn't reach the communication base station CS, and prepares for retry of the continued packet signal D2.

When the receiving terminal PS2 receives the down-packet signal indicated by the access control information as (B, 0), the packet signal receiving unit 21 judges that the retry request has been accepted, and performs the receiving processing of the down-user data of the received down-packet signal.

Assume that the receiving terminal PS3 doesn't receive the down-packet signal for retry this time. The access control information analytical unit 22 of the receiving terminal PS3 recognizes the failure of receiving the packet signal, and the NAK signal creating unit 23 creates and sends a NAK signal. The NAK signal collides with the continued packet signal D2 sent from the sending terminal PS1 at the same timing.

In the communication base station CS, when the collision/NAK signal detecting unit 33 detects the collision of the up-packet signals or it receives the NAK signal by the capture effect, the packet signal sending and receiving control unit 32 judges that the NAK signal has been sent regarding to the resent packet signal, turns the value of the destination address to "0", and resends the down-packet signal for retry again which was sent just before.

When the sending terminal PS1 receives the down-packet signal indicated by the access control information as (B, 0), the packet signal sending control unit 11 judges that the D2 it just resent didn't reach the communication base station CS, and prepares for retry of the continued packet signal D2.

When the receiving terminals PS2 and PS3 receive the down-packet signal with the destination address "0" indicated by the access control information as (B, 0), the respective packet signal receiving units 21 judge that the packet signal which they didn't receive is for retry, discard the respective packet signals and prepare for receiving the continued down-packet signals.

Figure 9:
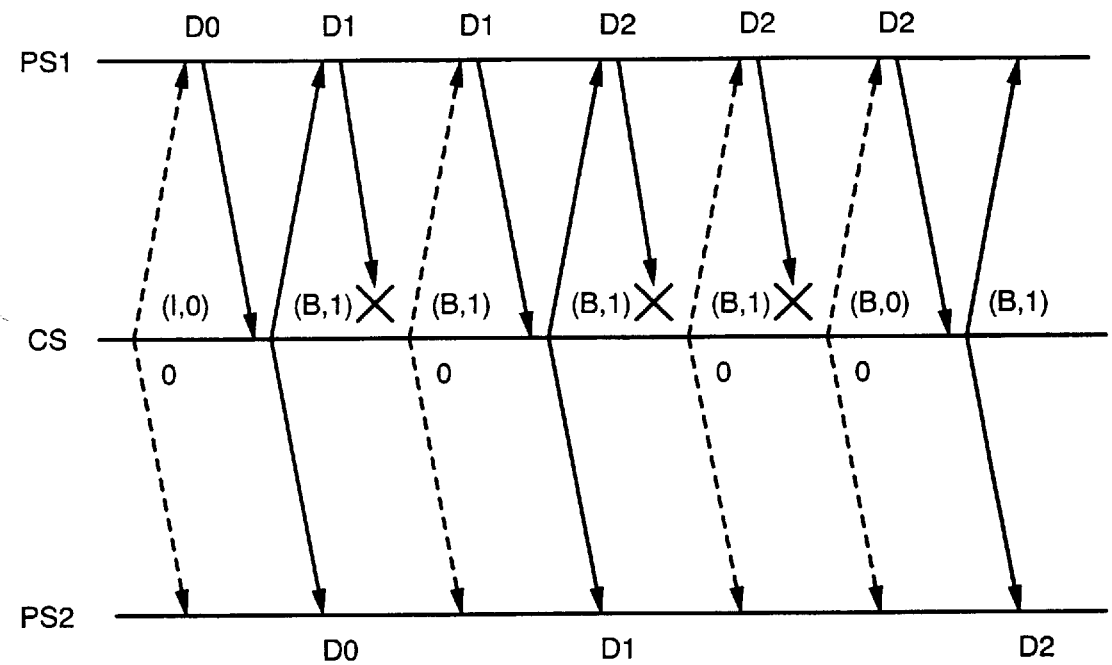
FIG. 9 is a sequence view for describing the further example of movement according to the embodiment.

FIG. 9 shows a movement in the case where the up-packet signal sent from the sending terminal PS1 isn't received by the communication base station CS.

The movement through the step of sending the continued packet signal D1 by the sending terminal PS1 is the same as that of FIG. 5. Assume that the communication base station CS doesn't receive the continued packet signal D1. The packet signal sending and receiving control unit 32 of the communication base station CS judges that the packet signal from the receiving terminal didn't reach here according to the information on the continued bit, the access control information creating unit 31 turns the access control information to (B, 1), and the packet signal sending and receiving control unit 32 fixes the value of the destination address as "0", thereby to send the down-packet signals.

When the sending terminal PS1 receives the down-packet signal with the destination address "0" indicated by the access control information as (B, 1), the packet signal sending control unit 11 judges that the packet signal D1 it just sent didn't reach the communication base station CS, and prepares for resending the packet signal D1, then to resend it at the timing of the next up-packet signal.

When the receiving terminals PS2 receives the down-packet signal with the destination address "0" indicated by the access control information as (B, 1), the packet signal receiving unit 21 judges that the packet signal from the sending terminal didn't reach the communication base station CS, discards the packet signal with the destination address "0" and prepares for receiving the continued down-packet signal.

Subsequently, the packet signal D1 is sent from the sending terminal PS1 at the sending timing of the next up-packet signal. When it is normally received by the communication base station CS, normal operation in receiving is performed.

When the packet signal D2 is sent from the sending terminal PS1 and isn't received by the communication base station CS, a down-packet signal with the access control information fixed as (B, 1) and with the destination address fixed as "0" is sent from the communication base station CS, similarly to the above mentioned process. The sending terminal PS1 resends the packet signal D2 similarly to the above mentioned case. The receiving terminal PS2 discards the packet signal with the destination address "0" and prepares for receiving the continued down-packet signal.

Assume that the packet signal D2 resent from the sending terminal PS1 doesn't reach the communication base station CS again.

The packet signal sending and receiving control unit 32 of the communication base station CS judges that the packet signal from the receiving terminal didn't reach here continuously, according to the information on the stored continued bit, the access control information creating unit 31 turns the access control information to (B, 0) and the packet signal sending and receiving control unit 32 fixes the destination address as "0", thereby to send the down-packet signals.

When the sending terminal PS1 receives the down-packet signal with the destination address "0" indicated by the access control information as (B, 0), the packet signal sending control unit 11 judges that the packet signal D2 it just sent didn't reach the communication base station CS, and prepares for resending the packet signal D2, then to resend it at the timing of the next up-packet signal.

When the receiving terminals PS2 receives the down-packet signal with the destination address "0" indicated by the access control information as (B, 0), the packet signal receiving unit 21 judges that the packet signal from the sending terminal didn't reach the communication base station CS, discards the packet signal with the destination address "0" and prepares for receiving the continued down-packet signal.

Figure 10:
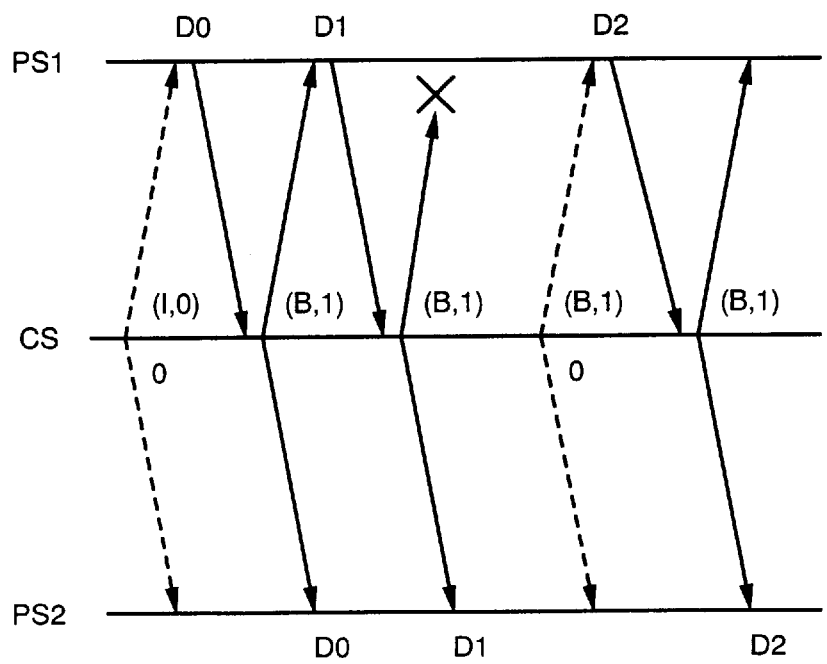
FIG. 10 is a sequence view for describing the further example of movement according to the embodiment.

FIG. 10 shows a movement in the case where the sending terminal PS1 doesn't receive the down-packet signal sent from the communication base station CS.

The movement through the step of the communication base station CS receiving the packet signal D1 sent from the sending terminal PS1 is the same as that of the above mentioned examples. This time, assume that the sending terminal PS1 doesn't receive the down-packet correspond to the packet signal D1 sent by the communication base station CS but that the receiving terminal PS2 receives it.

Since the sending terminal PS1 cannot receive the down-packet signal, it doesn't perform the sending operation at the timing of the next packet sending. The receiving terminal PS2, having received the down-packet signal normally, waits for sending the next down-packet signal without sending a NAK signal.

Not receiving any packet signal at the timing of up-packet signal when the continued packet should be received, the communication base station CS sends the down-packet signals with the access control information fixed as (B, 1) and the destination address fixed as "0".

Upon receipt of the down-packet signal with the access control information (B, 1) and the destination address "0", the sending terminal PS1 judges that the packet signal D1 which was sent previously has been received by the communication base station CS, and sends the next continued packet signal D2.

Upon receipt of the down-packet signal with the access control information (B, 1) and the destination address "0", the receiving terminal PS2 judges that the up-packet signal from the sending terminal didn't reach the communication base station CS, discards the packet signal with the destination address "0" and prepares for receiving the continued packet signal.

Figure 11:
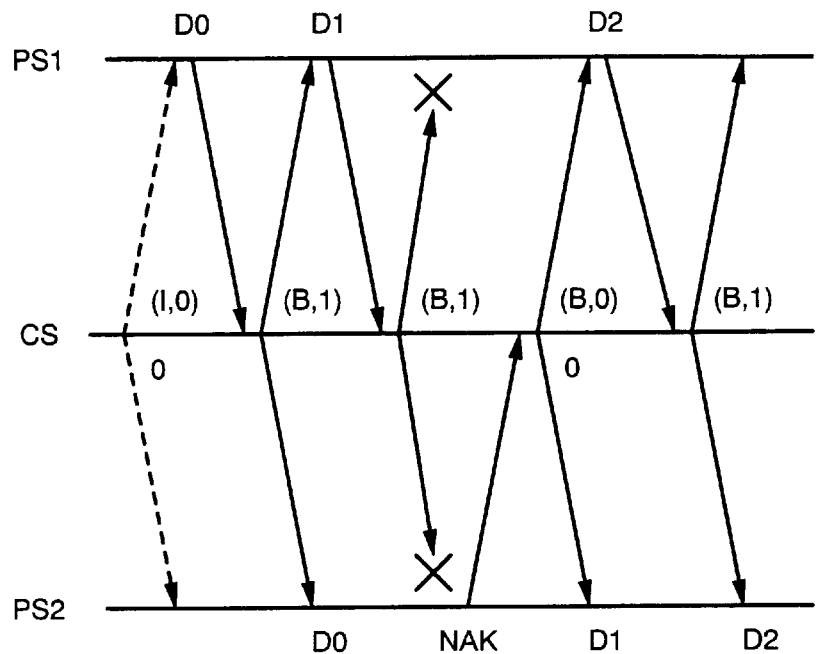
FIG. 11 is a sequence view for describing the further example of movement according to the embodiment.

FIG. 11 shows a movement in the case where neither the sending terminal PS1 nor the receiving terminal PS2 receive the down-packet signals sent by the communication base station CS.

The movement through the step of the communication base station CS receiving the packet signal D1 sent from the sending terminal PS1 is the same as that of FIG. 10. This time, assume that neither the sending terminal PS1 nor the receiving terminal PS2 received the down-packet signal correspond to the packet signal D1 sent from the communication base station CS.

The sending terminal PS1 doesn't perform the sending operation at the sending timing of the next packet because it couldn't receive the down-packet signal. While, the receiving terminal PS2 sends a NAK signal, because it couldn't receive the down-packet signal at the receiving timing.

Receiving the NAK signal at the timing of up-packet signal when the continued packet should be received, the communication base station CS fixes the access control information as (B, 0) and sends it together with the user data just before sent as the down-packet signal, as a new down-packet signal.

The sending terminal PS1, upon receipt of the down-packet signal including the resent user data and the access control information (B, 0), judges that the packet signal D1 has been received by the communication base station CS, and sends the next packet signal D2.

The receiving terminal PS2, upon receipt of the down-packet signal with the access control information (B, 0). Judges that the retry request is accepted and performs the receiving operation of the down-user data of the down-packet signal.

Figure 12:
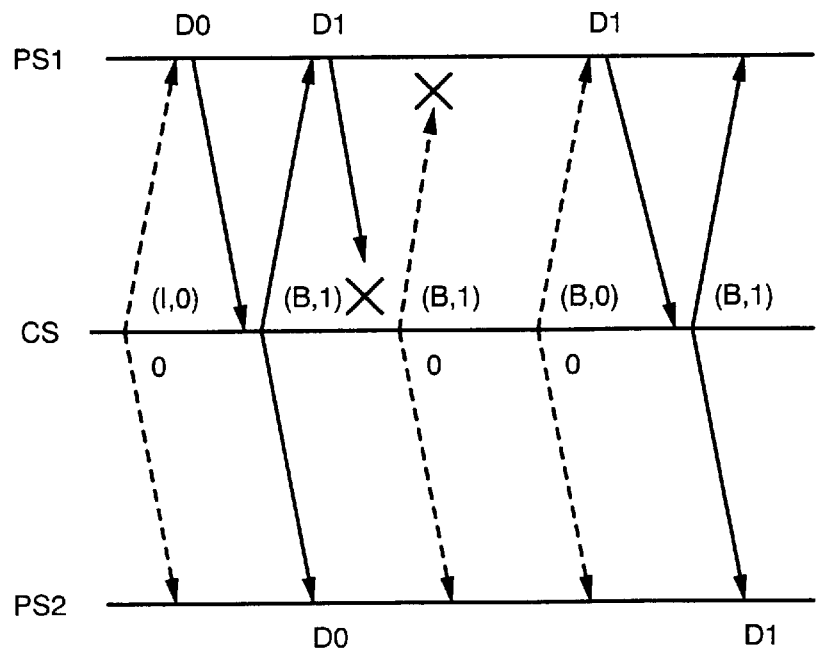
FIG. 12 is a sequence view for describing the further example of movement according to the embodiment.

FIG. 12 shows a movement in the case where the communication base station which doesn't receive the up-packet signal from the sending terminal PS1 provides the down-packet signals, and the down-packet signal isn't received by the sending terminal PS1 but received by the receiving terminal PS2.

The movement through the sending terminal PS1 sending the packet signal D1 is the same as that of FIG. 10. This time, assume that the packet signal D1 is not received by the communication base station CS, and that although the communication base station CS sends the down-packet signals with the access control information (B, 1) and the destination address "0", the sending terminal PS1 doesn't receive the down-packet signal but only the receiving terminal PS2 receives it.

The sending terminal PS1 doesn't perform the sending at the next sending timing because of the failure in receiving the down-packet signal. While, the receiving terminal PS2, having received the down-packet signal with the access control information (B, 1) and the destination address "0", judges that the packet signal from the sending terminal PS1 didn't reach the communication base station CS, discards the down-packet signal with the destination address "0" and prepares for receiving the continued down-packet signal.

The communication base station CS will not receive the up-packet signal from the sending terminal PS1 continuously, because it doesn't receive any packet signal at the timing of the up-packet signal. Therefore, the access control information is turned to (B, 0) and the destination address is fixed as "0", so to send such down-packet signals.

The sending terminal PS1, upon receipt of the down-packet signal with the access control information (B, 0) and the destination address "0", judges that the packet signal D1 was not received by the communication base station CS, and resends the packet signal D1 again.

The receiving terminal PS2, having received the down-packet signal with the access control information (B, 0) and the destination address "0", judges that the packet signal from the sending terminal PS1 didn't reach the communication base station CS, discards the down-packet signal with the access control information (B, 0) and the destination address "0" and prepares for receiving the continued down-packet signal.

Figure 13:
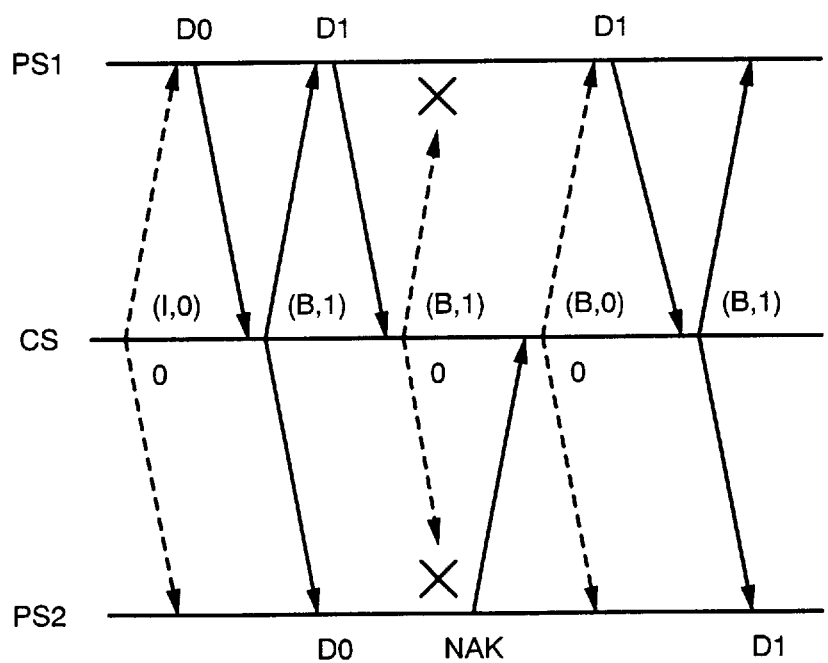
FIG. 13 is a sequence view for describing the further example of movement according to the embodiment.

FIG. 13 shows a movement in the case where the communication base station which doesn't receive the up-packet signal from the sending terminal PS1 provides the down-packet signals, and neither the sending terminal PS1 nor the receiving terminal PS2 receive the down-packet signals.

The movement through the step of the sending terminal PS1 sending the packet signal D1 is the same as that of FIG. 10. This time, assume that the packet signal D1 is not received by the communication base station CS and that although the communication base station CS sends the down-packet signals with the access control information (B, 1) and the destination address "0", neither the sending terminal PS1 nor the receiving terminal PS2 receive the down-packet signals.

The sending terminal PS1 doesn't perform the sending at the next sending timing because of the failure in receiving the down-packet signal. While, the receiving terminal PS2 sends a NAK signal because of the failure of receiving the down-packet signal at the timing when it should be received.

The communication base station CS which couldn't receive the up-packet signal from the sending terminal PS1 continuously, because of receipt of the NAK signal at the timing of the next up-packet signal, sends the down-packet signal with the access control information turned to (B, 0) and the destination address fixed as "0".

The sending terminal PS1, upon receipt of the down-packet signal with the access control information (B, 0) and the destination address "0", judges that the packet signal D1 was not received by the communication base station CS, and resends the packet signal D1 again.

The receiving terminal PS2, upon receipt of the down-packet signal with the access control information (B, 0) and the destination address "0", judges that the up-packet signal from the sending terminal PS1 didn't reach the communication base station CS, discards the packet with the access control information (B, 0) and the destination address "0" and prepares for receiving the continued packet signal.

As mentioned in the above examples, the receiving terminal of the present invention is capable of assembling a signal according to the sending procedure as in the sending terminal, regardless of the presence of retry of the packet signal in the sending terminal, thereby enabling the packet transmission using a plurality of independent radio channels. In this case, since assembly procedure of a signal is complicated compared with the packet transmission by a single slot, a movement of a receiving terminal will be described with reference to the drawings.

Figure 14:
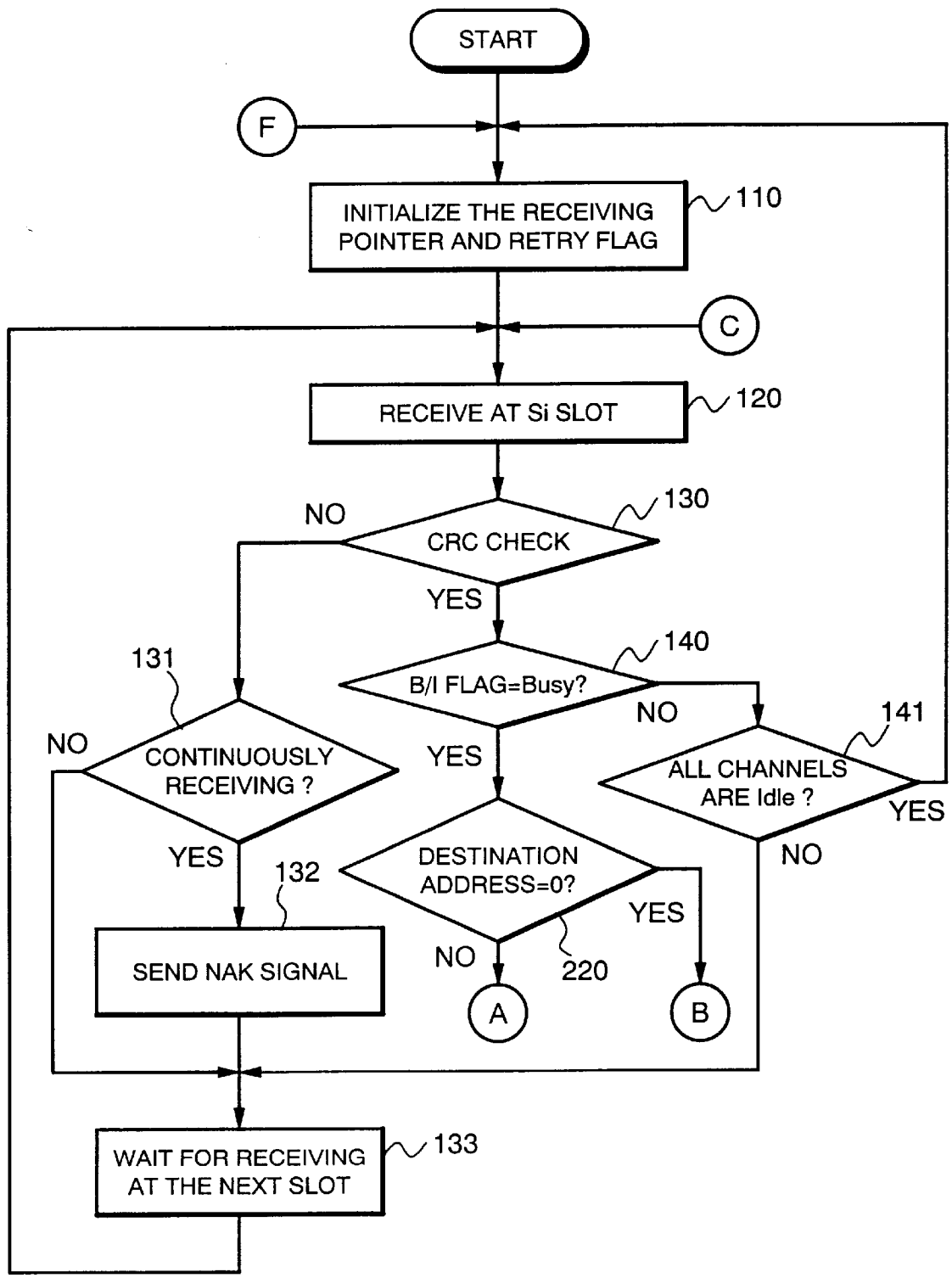
FIG. 14 is a flow chart showing one part of the movement on the receiving terminal when performing packet transmission through a plurality of channels in the embodiment.
Figure 15:
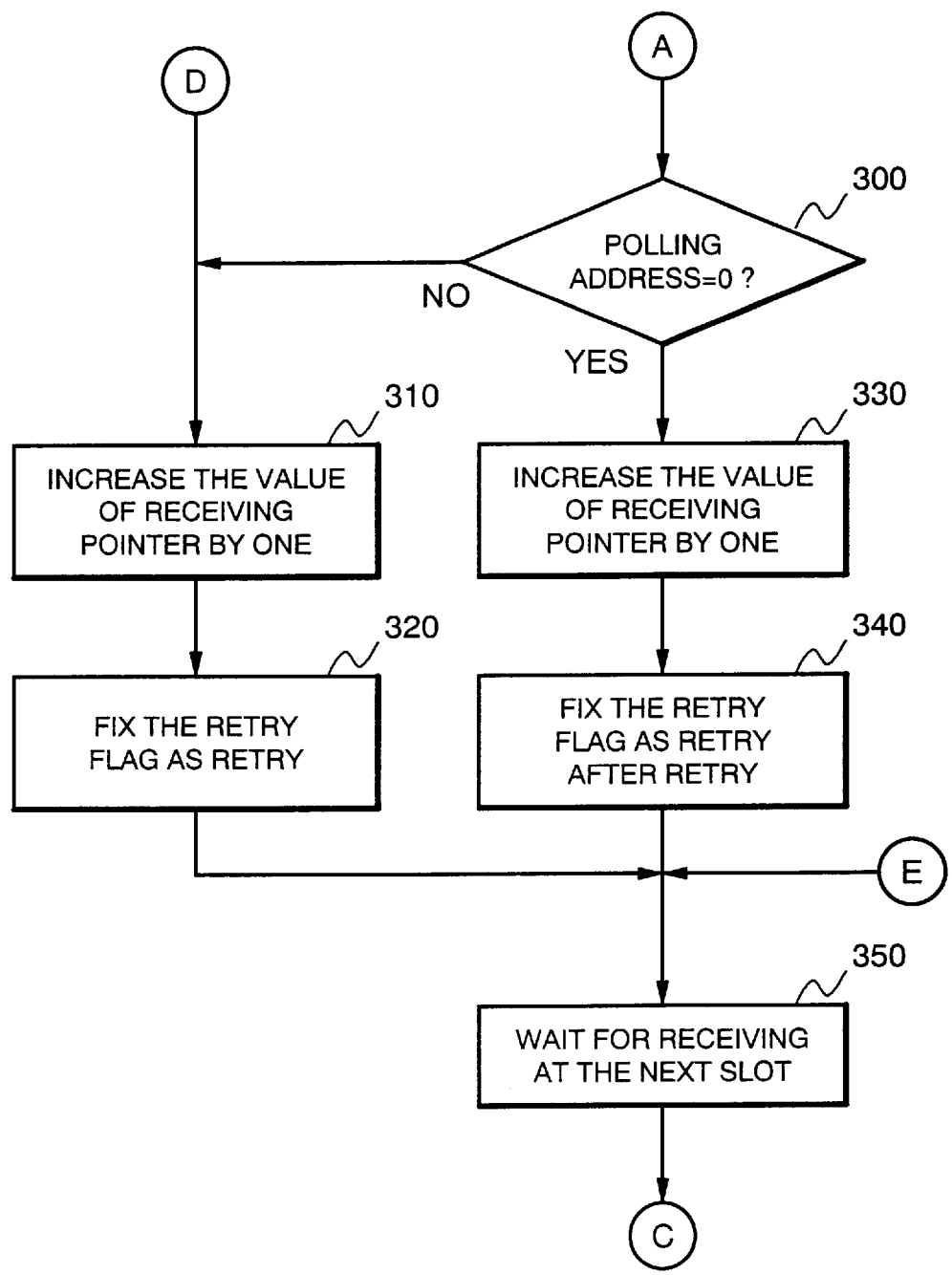
FIG. 15 is a flow chart showing the other part of the movement of the receiving terminal when performing packet transmission through a plurality of channels in the embodiment.
Figure 16:
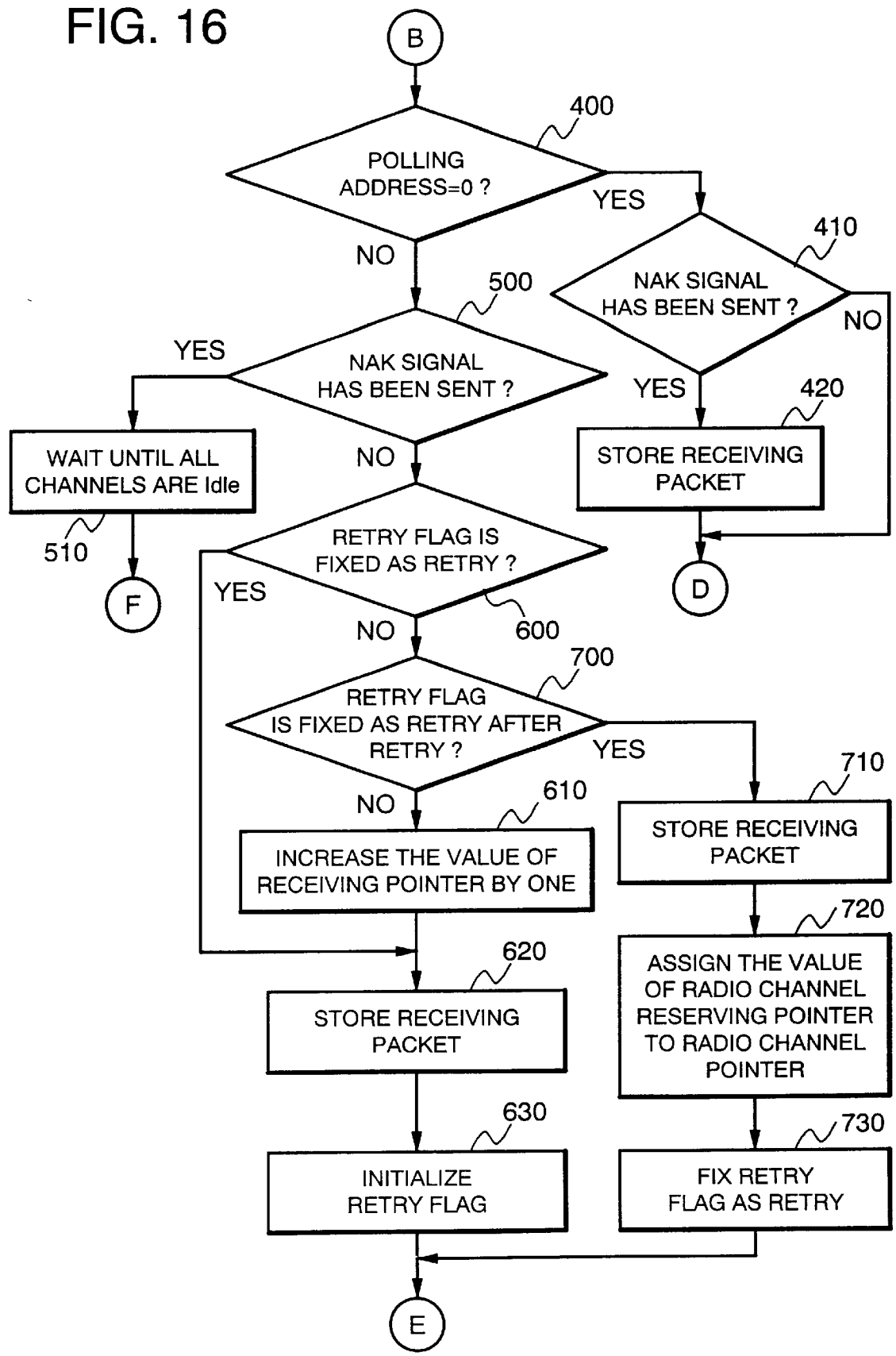
FIG. 16 is a flow chart further showing the other part of the movement of the receiving terminal when performing packet transmission through a plurality of channels in the embodiment.

FIGS. 14 to 16 are flow charts in the TDMA/TDD communication control system respectively showing a receiving movement of the receiving terminal where a plurality of slots correspond to a plurality of independent radio channels.

In the receiving terminal, when the transmitter-receiver 24 starts receiving the continued packet signal, the packet signal receiving unit 21 initializes a receiving pointer and a retry flag (Step 110). The packet signal is assumed to be received at the $S_i$ slot (the i-th slot) in the receiving terminal (Step 120). The packet signal receiving unit 21 performs check by the CRC (Step 130). Upon detecting an error through the check by the CRC, it is judged whether the present terminal is continuously receiving the packet signal, or not (Step 131). If the packet signal is continuously being received, the NAK signal creating unit 23 sends the NAK signal, and the packet signal receiving unit 21 fixes the retry flag as retry (Step 132). If it is not continuously being received, the system enters the receiving wait state at the $S_{i+i}$ slot next to the $S_i$ slot (Step 133).

If any error is not detected through the check by the CRC, it is judged whether the Busy/Idle flag is Busy or not (Step 140). When the Busy/Idle flag is not Busy, it is judged whether or not the all using slots turn to Idle (Step 141). When a part of the slots turns to Idle, the system enters the receiving wait state at the slot in the next order (Step 133). While, when all the slots turn to Idle, it returns to the initial state.

When the Busy/Idle flag is Busy, it is judged whether the destination address of the receiving packet is "0" or not (Step 200). When the destination address is "0", it is judged whether the polling address of the access control information of the received packet signal is "0" or not (Step 300). When the polling address is "0", the value of the receiving pointer is increased by one, and the resultant value of the receiving pointer is assigned to the radio channel reserving pointer corresponding to the slot receiving the packet signal (Step 330). After fixing the retry flag as retry after retry (Step 340), the system enters the receiving wait state at the slot in the next order (Step 350).

When the polling address is not "0", the value of the receiving pointer is increased by one and the resultant value of the receiving pointer is assigned to the radio channel pointer corresponding to the slot receiving the packet signal (Step 310). After fixing the retry flag as retry (Step 320), the system enters the receiving wait state at the slot in the next order (Step 350).

When the destination address is not "0" in Step 200, it is judged whether the polling address of the access control information of the received packet signal is "0" or not, the value "0" being assigned to none of the terminals (Step 400). When the polling address is "0", it is judged whether or not the present terminal sent the NAK signal at the slot just before (Step 410). When the NAK signal is sent, the receiving packet is stored at the position of the receiving buffer indicated by the radio channel pointer corresponding to the slot receiving the same packet signal (Step 420). The value of the receiving pointer is increased by one and the resultant value of the receiving pointer is assigned to the radio channel pointer (Step 310). After fixing the retry flag as retry (Step 320), the system enters the receiving wait state at the slot in the next order (Step 350).

When the NAK signal is not received in Step 410, it turns to Step 310 without storing the received packet into the receiving buffer. The value of the receiving pointer is increased by one and the resultant value of the receiving pointer is assigned to the radio channel pointer corresponding to the slot receiving the packet signal. After fixing the retry flag as retry (Step 320), the system enters the receiving wait state at the slot in the next order (Step 350).

When the polling address of the access control information is not "0" in Step 400, it is judged whether or not the present terminal sent the NAK signal at the slot just before (Step 500). When the NAK signal is not sent, the system enters the wait state until all the using radio channels turn to be Idle (Step 510).

While, when the NAK signal is sent in Step 500, it is judged whether the retry flag is fixed as retry (Step 600). When it is fixed as retry, the received packet is stored at the position of the receiving buffer indicated by the radio channel pointer corresponding to the slot receiving the same packet signal (Step 620), and after initializing the retry flag (Step 630), it enters the receiving wait state at the slot in the next order (Step 350).

When it is not fixed as retry in Step 600, it is judged whether or not the retry flag is fixed as retry after retry (Step 700). When it is not fixed as retry after retry, the value of the receiving pointer is increased by one and the resultant value of the receiving pointer is assigned to the radio channel pointer corresponding to the slot receiving the packet signal (Step 610). The received packet is stored at the position of the receiving buffer indicated by the radio channel pointer (Step 620), and after initializing the retry flag (Step 630), it enters the receiving wait state at the next slot (Step 350).

When it is fixed as retry after retry in Step 700, the received packet is stored at the position of the receiving buffer indicated by the radio channel pointer corresponding to the slot receiving the packet signal (Step 710). The value of the radio channel reserving pointer indicating the same slot is assigned to the radio channel pointer (Step 720), and after fixing the retry flag as retry (Step 730), the system enters the receiving wait state at the next slot (Step 350).

FIG. 17 is a sequence view showing a movement of the receiving terminal, from a given aspect, where a plurality of slots correspond to a plurality of independent radio channels. This example will be described provided that two slots of slot 0 and slot 1 in the TDMA/TDD system correspond to a plurality of radio channels.

In FIG. 17, CS represents a communication base station. PS1 and PS2 represent communication terminals each having address 1 and 2. The sending terminal PS1 and PS2 have a common group address respectively. In this example, PS1 is regarded as a sending terminal and PS2 is regarded as a receiving terminal. The packet signals D1, D2, D3, D4 and D5 are sent from the sending terminal PS1. As far as there is no specification, the data transmission from the communication base station is performed with the group address common to each communication terminal used as the destination address.

With reference to FIG. 17, the communication base station CS sends (I, 0) as the access control information for a down-packet signal two times. Each communication terminal PS receives the above access control information and stores the sending timing for an up-signal.

When the sending terminal PS1 sends the packet signals D1 and D2 at the sending timing of the up-signal two times, the communication base station CS, upon receipt of the packet signal D1, judges the presence of the continued packet signal on the basis of the up-user data and the continued bit, and stores the result. At this time, the up-packet signal is shifted to the down-packet signal. The communication base station CS receives the packet signal D2 successively and performs the same operation. Next, the communication base station CS sends the down-packet signals at the sending timing for down corresponding to the receiving timing of each received packet signal.

In the receiving terminal PS2 having received the down-packet signal D1, the receiving pointer is fixed as "1", the value "1" of the receiving pointer is assigned to the radio channel pointer 0 corresponding to the slot 1, and the received packet signal D1 is stored at the position "1" of the receiving buffer (store [j]) indicated by the radio channel pointer 0. Upon receipt of the packet signal D2, it is stored at the position "2" of the receiving buffer by the similar processing.

Assume that the packet signal D3 sent from the sending terminal PS1 is not received by the communication base station CS, but the packet signal D4 successively sent from the sending terminal PS1 is received by the communication base station CS.

The communication base station CS judges that the packet signal from the sending terminal PS1 doesn't reach here on the basis of the stored information on the continued bit, then turning the access control information to (B, 1) and fixing the destination address as "0" in the down-slot corresponding to the slot destined to receive the D3, so to send the down-packet signals.

The sending terminal PS1, upon receipt of the down-packet signal with the access control information (B, 1) and the destination address "0", judges that the packet signal D3 it just sent didn't reach the communication base station CS, prepares for sending the packet signal D3 again and resends it at the timing of the up-packet signal.

The receiving terminal PS2, upon receipt of the down-packet signal with the access control information (B, 1) and the destination address "0", judges that the packet signal from the sending terminal PS1 didn't reach the communication base station CS, discards the received packet signal with the destination address "0" and prepares for receiving the continued down-packet signal. In the receiving terminal PS2, the value of the receiving pointer is turned to "3" by increasing it by one, the new value "3" of the receiving pointer is assigned to the radio channel pointer 0 corresponding to the slot 0, and the retry flag 0 corresponding to the slot 0 is fixed as retry. When the packet signal D4 successively sent by the sending terminal PS1 is normally received by the receiving terminal PS2, the value of the receiving pointer is turned to "4" by increasing it by one, and the new value "4" of the receiving pointer is assigned to the radio channel pointer 1 corresponding to the slot 1. The packet signal D4 is stored at the position "4" of the receiving buffer indicated by the radio channel pointer 1.

Assume that the packet signal D3 is resent at the slot 0 from the sending terminal PS1, the packet signal D5 following the packet signal D4 normally transmitted at the previous cycle is sent, and both signals are received by the communication base station CS as well as by the receiving terminal PS2 normally.

Upon receipt of the packet signal D3, the receiving terminal PS2 stores the received D3 at the position "3" of the receiving buffer which the radio channel pointer 0 stores, without increasing the receiving pointer because of the retry flag 0 fixed as retry.

Next, upon receipt of the packet signal D5 successively sent, the receiving terminal PS2 turns the value of the receiving pointer to "5", by increasing it by one, the new value "5" of the receiving pointer is assigned to the radio channel pointer 1 corresponding to the slot 1, and stores the received packet signal D5 at the position "5" of the receiving buffer indicated by the radio channel pointer 1.

As set forth hereinabove, in the transmission control system of the present invention, the receiving terminal having failed in receiving a packet signal at the timing when it should be received, transmits a signal indicating negative acknowledgment, so to delay the continuous transmission to the sending terminal, and issues retry request to the communication base station. Therefore, the retry of a packet signal can be performed without giving any excessive load to the sending terminal.

Further, according to the access control information added to the down-packet signal, the transmission control system of the present invention can judge whether a packet signal sent from the communication base station is the resent one or not. Therefore, it is possible that only the terminal requested to resend the packet signal performs such receiving processing, thereby enabling the acknowledgment and sequence control in one-to-multiple site communication.

According to the present invention, all the communication terminals can confirm that the retry request has been performed on the corresponding packet signal for retry the communication base station sent, by specifying the value of the access control information and the destination address, thereby enabling the acknowledgment of the resent packet signal.

Further, according to the present invention, the communication base station, storing the information about the success or failure in receiving the last packet signal or the packet signal before the last at the receiving timing when it should be received, informs terminals of the information as the access control information. Therefore, even if there is a temporary break-down in the packet signal which should be sent to a sending terminal, transmission control can be properly performed.

Further, in the receiving terminal, a signal can be assembled according to the sending procedure in the receiving terminal, regardless of retry of a packet signal in a sending terminal, thereby enabling the packet transmission using a plurality of independent radio channels.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A transmission control system for performing one-to-multiple site data transmission by a radio packet communication, comprising:

a plurality of communication terminals and a communication base station for determining timing of access control as well as timing of sending and receiving transmission data, said communication terminals and said communication base station being connected via a radio packet communication system, wherein the base station broadcasts a packet signal received from a sending communication terminal to all the communication terminals;

wherein a receiving communication terminal sends a negative acknowledgment signal on the failure in receiving a packet signal sent from said communication base station, said communication base station resends the packet signal which is not received by said receiving communication terminal upon receipt of the negative acknowledgment signal, and a sending communication terminal resends the packet signal which it has sent just before receiving the packet signal resent from said communication base station.

2. A transmission control system as set forth in claim 1, wherein
said communication terminals work as a sending terminal, receiving terminal or a communication base station in relation with other said communication terminals.

3. A transmission control system as set forth in claim 1, wherein
said communication base station relays a received packet signal to said communication terminals after adding access control information thereto, and
said communication terminals judge whether or not the packet signal is the packet signal resent from said communication base station, with reference to the access control information added to the received packet signal.

4. A transmission control system as set forth in claim 1, wherein
said communication base station relays the received packet signal to said communication terminal after adding access control information thereto,
said communication terminals judge whether or not the packet signal is the packet signal resent from said communication base station, with reference to the access control information added to the received packet signal,
said receiving communication terminal sending the negative acknowledgment signal, when recognizing the received packet signal as the packet signal resent from said communication base station on the basis of the access control information, performs further receiving operation of the received packet signal, and
said communication terminals which do not send the negative acknowledgment signal, when recognizing the received packet signal as the packet signal resent from said communication base station on the basis of the access control information, discard the received pack signal.

5. A transmission control system as set forth in claim 1, wherein
said communication base station relays a received packet signal to said communication terminals after adding access control information thereto,
a communication terminal judges whether or not the packet signal is the packet signal resent from said communication base station, with reference to the access control information added to the received packet signal,
further, said receiving communication terminal sending the negative acknowledgment signal, on the basis of the access control information, performs further receiving operation of the packet signal when recognizing the received packet signal as the packet signal resent from said communication base station, or discards the packet signal and all the continued packet signals following this packet signal until receiving a new packet signal when recognizing the received packet signal as the packet signal which is not resent from said communication base station, and
said communication terminals which do not send the negative acknowledgment signal discard the received packet signal, when recognizing the received packet signal as the packet signal resent from said communication base station on the basis of the access control information.

6. A transmission control system as set forth in claim 1, wherein
said communication base station relays a received packet signal to said communication terminal after adding access control information thereto,
said communication terminals judge whether or not the packet signal is the packet signal resent from said communication base station, with reference to the access control information added to the received packet signal,
further, said communication base station sends the access control information and a predetermined value as a part of data of the packet signal as a timing when the packet should be received by said communication base station,
said communication terminal sending the packet signal failed in reaching said communication base station, resends the packet signal failed in reaching said communication base station upon receipt of a packet signal having a specified access control signal and data, and
all the receiving communication terminals, upon receipt of the packet signal having the specified access control signal and data, discard the packet signal and prepare for receiving the next packet signal.

7. A transmission control system as set forth in claim 1, wherein
said communication base station relays the received packet signal to said communication terminal with access control information added thereto,
said communication terminal judges whether or not the packet signal is the packet signal resent from said communication base station, with reference to the access control information added to the received packet signal,
further, said communication base station sends the access control information as well as a part of data of the packet signal as a specified value determined beforehand when failing in receiving a packet signal at the timing when it should be received by said communication base station,
said communication terminal sending the packet signal failed in reaching said communication base station, resends the packet signal failed in reaching said communication base station upon receipt of a packet signal having the specified access control signal and data,
all the receiving communication terminals, upon receipt of the packet signal having the specified access control signal and data, discard the packet signal and prepare for receiving the next packet signal,
further, said communication base station, when two consecutive failing in receiving a packet signal at the timing when it should be received, sends a packet signal including the information that it does not receive the packet signal,
said communication terminal sending the packet signal failed in reaching said communication base station, upon receipt of the packet signal including the information that said communication base station does not receive the packet signal, resends the packet signal failed in reaching said communication base station, and
all the receiving communication terminals, upon receipt of the packet signal including the information that said communication base station does not receive the packet signal, discard the packet signal and prepare for receiving the next packet signal.

8. A transmission control system as set forth in claim 1, wherein said communication terminals, provided with a plurality of slots, perform sending and receiving operation of a packet signal using a plurality of independent channels between said communication base station and each said communication terminal.

9. A transmission control system as set forth in claim 1, wherein said communication base station comprising an access control information creating means for creating access control information, a collision/NAK signal detecting means for detecting collision between a packet signal and the negative acknowledgment signal or detecting acceptance of the negative acknowledgment signal on a communication line, a packet signal sending and receiving control means for adding the access control information created by said access control information creating means to a received packet signal, for resending the necessary packet signal on the basis of the detection result of said collision/NAK signal detecting means, and a sending and receiving means for receiving a given signal on said communication line including the packet signal sent from said communication terminal, and for relaying a packet signal to said communication terminal according to the control of said packet signal sending and receiving control means, each of said communication terminal comprising:

a sending and receiving means for sending to said communication base station a packet signal supplied from a packet signal sending control means and for receiving a packet signal sent from said communication base station;

as means for realizing a function of a sending terminal, an access control information analytical means for detecting the access control information out of the packet signal sent from said communication base station and analyzing the same, and a packet signal sending control means for creating and supplying a packet signal on the basis of a given rule, and for supplying the packet signal which was sent just before, once more, when judging that said terminal has received the packet signal resent from said communication base station, on the basis of the analytical result of said access control information analytical means, as means for realizing a function of a receiving terminal, a packet signal receiving means for receiving and analyzing the packet signal sent from said communication base station, an access control information analytical means for detecting the access control information out of the packet signal sent from said communication base station and analyzing the same, and a NAK signal creating means for creating and supplying the negative acknowledgment signal when judging that said terminal cannot receive a packet signal on the basis of the analytical result of said access control information analytical means.

10. A transmission control system as set forth in claim 9, wherein said access control information includes at least the information indicating address of polling destination and the information indicating whether the communication line is busy or idle.

11. A transmission control system as set forth in claim 9, wherein with reference to the access control information added to a received packet signal, said packet signal sending control means and said packet signal receiving means judge whether or not the packet signal is the packet signal resent from said communication base station.

12. A transmission control system as set forth in claim 9, wherein when a received packet signal is judged to be the packet signal resent from said communication base station with reference to the access control information added to the received packet signal, said packet signal sending control means discards the received packet signal, and when the packet signal is judged to be the packet signal resent from said communication base station on the basis of the analytical result of said access control information analytical means with respect to the access control information detected out of the packet signal sent from said communication base station after said NAK signal creating means supplies the negative acknowledgment signal, said packet signal receiving means performs the ordinal receiving processing of the packet signal, when the packet signal is judged to be the packet signal resent from said communication base station, discards the packet signal and all the continued packet signal following this packet signal until receiving a new packet signal.

13. A transmission control system as set forth in claim 9, wherein said packet signal sending and receiving control means of said communication base station sends the access control information and a part of data of the packet signal as a given value determined beforehand, controlling said access control information creating means, when it cannot receive the packet signal at the timing when it should be received, said packet signal sending control means of said communication terminal sending the packet signal failed in reaching said communication base station, resends the packet signal failed in reaching said communication base station when it judges that a packet signal having the specified access control signal and data is received, according to the analytical result of said access control information analytical means, and said packet signal receiving means of the other of said communication terminal discards a packet signal and prepares for receiving the next packet signal, when it judges that the packet signal having the specified access control signal and data is received according to the analytical result of said access control information analytical means.

14. A transmission control system as set forth in claim 9, wherein said packet signal sending and receiving control means of said communication base station relays the access control information and a part of data of the packet signal as a given value determined beforehand, controlling said access control information creating means, when it can't receive the packet signal at the timing when it should be received, said packet signal sending control means of said communication terminal sending the packet signal failed in reaching said communication base station, resends the packet signal failed in reaching said communication base station when it judges that a packet signal having the specified access control signal and data is received, according to the analytical result of said access control information analytical means, said packet signal receiving means of the other of said communication terminal discards a packet signal and prepares for receiving the next packet signal, when it judges that the packet signal having the specified access control signal and data is received, according to the analytical result of said access control information analytical means, further, said packet signal sending and receiving control means of said communication base station sends a packet signal including the information that it does not receive the packet signal, when failing several times in receiving a packet signal at the timing when it should be received continuously, said packet signal sending control means of said communication terminal sending the packet signal failed in reaching said communication base station, resends the packet signal failed in reaching said communication base station, when judging that it has received the packet signal including the information that said communication base station doesn't receive the packet signal, according to the analytical result of said access control information analytical means, and said packet signal receiving means of the other of said communication terminal, discards the packet signal and prepares for receiving the next packet signal, when judging that it has received the packet signal including the information that said communication base station does not receive the packet signal, according to the analytical result of said access control information analytical means.

* * * * *